US012235980B2

(12) United States Patent
Buscemi et al.

(10) Patent No.: US 12,235,980 B2
(45) Date of Patent: Feb. 25, 2025

(54) METHODS AND APPARATUS FOR AUTOMATICALLY CENSORING, MODIFYING AND/OR CONTROLLING DISTRIBUTION OF IMAGES INCLUDING MULTIPLE PEOPLE

(71) Applicant: CECELUMEN, LLC, Camarillo, CA (US)

(72) Inventors: James Buscemi, Camarillo, CA (US); Jason Laver, Thousand Oaks, CA (US); James Harvey Brodeur, Camarillo, CA (US); Benjamin Baysinger, Camarillo, CA (US)

(73) Assignee: CECELUMEN, LLC, Camarillo, CA (US)

( * ) Notice: Subject to any disclaimer, the term of this patent is extended or adjusted under 35 U.S.C. 154(b) by 345 days.

(21) Appl. No.: 17/507,801

(22) Filed: Oct. 21, 2021

(65) Prior Publication Data

US 2022/0121764 A1 Apr. 21, 2022

Related U.S. Application Data

(60) Provisional application No. 63/094,891, filed on Oct. 21, 2020.

(51) Int. Cl.
*G06F 21/62* (2013.01)
*G06T 5/70* (2024.01)
*G06T 5/77* (2024.01)

(52) U.S. Cl.
CPC ............ *G06F 21/6218* (2013.01); *G06T 5/70* (2024.01); *G06T 5/77* (2024.01)

(58) Field of Classification Search
CPC .......... G06F 21/6218; G06T 5/77; G06T 5/70
See application file for complete search history.

(56) References Cited

U.S. PATENT DOCUMENTS

| 5,177,889 | A | 1/1993 | Ching Hwei |
| 5,692,327 | A | 12/1997 | Wynne et al. |
| 6,556,337 | B1 | 4/2003 | Wright |
| 8,984,151 | B1 | 3/2015 | Hsieh et al. |
| 9,396,354 | B1 | 7/2016 | Murphy et al. |

(Continued)

FOREIGN PATENT DOCUMENTS

| JP | 2016200753 A | 12/2016 |
| JP | 2016538661 A | 12/2016 |

(Continued)

*Primary Examiner* — Pinalben Patel
(74) *Attorney, Agent, or Firm* — Straub & Straub; Michael P. Straub; Stephen T. Straub (57) ABSTRACT

Methods and apparatus for processing group images for distribution are described. Images corresponding to a group may be and sometimes are modified differently prior to being supplied to members of the group than when being supplied to entities which are not members of the group to which the image corresponds. Images of group members maybe and sometimes are replaced. Group members can provide an image to be used in the replacement process so that multiple group images which include a similar user determined image of the individual. This can make it appear that the same individual is present in multiple different group images while still not providing visual details of the actual individual in the group images.

28 Claims, 8 Drawing Sheets

(56) References Cited

U.S. PATENT DOCUMENTS

| | | |
|---|---|---|
| 9,702,183 B1 | 7/2017 | Ochiai et al. |
| 9,934,397 B2 | 4/2018 | Calo et al. |
| 10,129,253 B2 | 11/2018 | Buscemi |
| 10,346,119 B2 | 7/2019 | LeBlanc et al. |
| 11,089,014 B2 | 8/2021 | Buscemi |
| 11,936,648 B2 | 3/2024 | Buscemi |
| 2004/0036952 A1 | 2/2004 | Wright |
| 2006/0000895 A1 | 1/2006 | Bonalle et al. |
| 2007/0153091 A1 | 7/2007 | Watlington et al. |
| 2007/0185718 A1 | 8/2007 | Di Mambro et al. |
| 2008/0012827 A1 | 1/2008 | Ryu et al. |
| 2008/0062008 A1 | 3/2008 | Morimoto et al. |
| 2010/0192096 A1 | 7/2010 | Barrett |
| 2011/0078933 A1 | 4/2011 | Lukawitz et al. |
| 2011/0093411 A1 | 4/2011 | Gibson |
| 2011/0202968 A1 | 8/2011 | Nurmi |
| 2011/0252675 A1 | 10/2011 | Thomas |
| 2012/0011085 A1 | 1/2012 | Kocks et al. |
| 2012/0241227 A1 | 9/2012 | Rogers et al. |
| 2012/0256541 A1 | 10/2012 | Dandrow |
| 2012/0287326 A1 | 11/2012 | Border et al. |
| 2013/0173466 A1 | 7/2013 | Lepisto et al. |
| 2013/0311664 A1* | 11/2013 | Pirnazar ................ H04L 65/403 709/227 |
| 2013/0335807 A1 | 12/2013 | Arsenault et al. |
| 2014/0003082 A1 | 1/2014 | Calderas |
| 2014/0287723 A1 | 9/2014 | LaFever et al. |
| 2014/0337930 A1 | 11/2014 | Hoyos et al. |
| 2015/0026078 A1 | 1/2015 | Weich et al. |
| 2015/0033153 A1* | 1/2015 | Knysz .................. H04L 65/403 715/753 |
| 2015/0128285 A1 | 5/2015 | LaFever et al. |
| 2015/0161970 A1 | 6/2015 | Sunkara et al. |
| 2015/0194082 A1 | 7/2015 | McEwan |
| 2015/0261813 A1* | 9/2015 | Pappula ................ H04L 67/535 707/758 |
| 2015/0360604 A1 | 12/2015 | Cameron et al. |
| 2016/0025978 A1 | 1/2016 | Mallinson |
| 2016/0152177 A1 | 6/2016 | Dandrow |
| 2017/0174137 A1 | 6/2017 | Kawaguchi |
| 2018/0060542 A1 | 3/2018 | Anders |
| 2018/0088887 A1 | 3/2018 | LeBlanc et al. |
| 2019/0014271 A1 | 1/2019 | Itoh et al. |
| 2019/0213931 A1 | 7/2019 | Brubaker |
| 2019/0379750 A1 | 12/2019 | Zamora Duran et al. |
| 2020/0007338 A1 | 1/2020 | Oh |
| 2020/0104092 A1* | 4/2020 | Cohen .................. G06F 3/0482 |
| 2020/0184098 A1 | 6/2020 | Andrasick et al. |
| 2020/0211201 A1* | 7/2020 | Chiang ................ G06T 11/001 |
| 2020/0292905 A1 | 9/2020 | Larry et al. |
| 2021/0056750 A1* | 2/2021 | Rowley .................. G06F 3/016 |
| 2021/0133355 A1 | 5/2021 | Verma et al. |
| 2022/0121764 A1* | 4/2022 | Buscemi .................. G06T 5/70 |
| 2022/0198062 A1 | 6/2022 | Buscemi et al. |
| 2022/0230457 A1 | 7/2022 | Buscemi |
| 2022/0329589 A1 | 10/2022 | Buscemi et al. |

FOREIGN PATENT DOCUMENTS

| | | |
|---|---|---|
| WO | 2016092383 A1 | 6/2016 |
| WO | 2019020973 A1 | 1/2019 |

* cited by examiner

METHODS AND APPARATUS FOR AUTOMATICALLY CENSORING, MODIFYING AND/OR CONTROLLING DISTRIBUTION OF IMAGES INCLUDING MULTIPLE PEOPLE

RELATED APPLICATIONS

The present application claims the benefit of the filing date of U.S. Provisional Patent Application Ser. No. 63/094,891 which was filed Oct. 21, 2020 and which is hereby expressly incorporated by reference in its entirety.

FIELD

The present application relates to image processing and, more particularly, to methods and apparatus for automatically processing group images for distribution purposes in a way that allows protection of the privacy of one or more individuals included in the group image.

BACKGROUND

It is common to capture images including multiple individuals. For example, school photos may include images of multiple children in a class. A photo taken at a sports game may include multiple team members. Similarly, photos taken at a private party may include images of multiple party goers.

For privacy reasons individuals may seek to avoid dissemination of themselves or of their children. For example, with regard to children of influential families, there may be a concern that public images of a child might enable undesirable individuals to identify and target a child.

Even for average individuals it can be desirable that privacy be maintained and an individual might for a variety of reasons seek to limit unauthorized distribution of images of that individual, be it either online or via other distribution channels.

For schools and/or other organizations seeking to capture and distribute images of activities, classes, and/or other social gatherings, it would be desirable if there was a way to capture and distribute images of groups or sub-groups of people while still respecting the privacy rights of individuals who might not want their images generally distributed. While companies may want to respect individuals' privacy rights, individuals may also want to respect those individuals that wish to avoid having their own images distributed publicly.

While general privacy is one issue, controlling intended recipients for a captured image is another issue. An individual may be willing to allow his/her image to be shared or distributed among one group but not others. It would be desirable if a user could set limits or restrictions denoting authorized dissemination of their images, such as allowable groups and/or individuals, e.g., as part of a social media posting or other distribution of an image.

In view of the above, it should be appreciated that there is a need for methods and/or apparatus which allow an individual, whose image might be captured as part of a group photo, and/or a group to which the individual belongs, to control who can see the individual's image when the photo is distributed and/or to control concealment of the user's image when a group photo that included the user's image is distributed. It would also be desirable if in at least some cases a way could be devised to automatically protect non-group members of accidentally having their images distributed as part of a group image.

From an implementation perspective it would be desirable if the methods and/or apparatus could be automated with images of individuals in group images being automatically modified as needed to protect the privacy rights of one or more individuals captured in the group image.

SUMMARY

In some embodiments group images are captured and then uploaded to an image processing and distribution server. In some cases, the server then identifies individuals in the group image. Relationships between the individuals in the group and/or restrictions on distribution of images of one or more individuals in the group image are taken into consideration before one or more versions of the group image are distributed. Depending on the entity, e.g., individual, group or website to which the group image is to be provided, the processing of the group image may and sometimes vary, e.g., as a function of image processing and/or distribution rules.

In at least some embodiments a modified version of a group image corresponding to a particular group is processed based on rules corresponding to the particular group to which the group image is determined to correspond. Rules are stored in some embodiments for generating a modified image to be distributed to non-group members. In cases where group members are also to receive a modified version of the image rules are also stored for processing a group image to generate a modified group image for distribution to members of the group to which an image corresponds.

The stored rules for modifying images corresponding to a group can specify such things as altering images of members of the group included in the group image prior to distribution to non-group members and/or altering, e.g., blurring of images of non-group members included in the group image.

The rules can be and sometimes are based on image authorization agreements entered into with or by group members, e.g., agreements signed by parents or students on a school sports team, in the case of school group images. The agreements may and sometimes do allow distribution of student group images to other members of the group, e.g., team while restricting distribution of unaltered images to entities who are not members of the group, e.g., school team.

Rules regarding alteration of images of non-group members can be implemented to protect the privacy of individuals incidentally or unintentionally captured in a group image. This can be useful where group images have been authorized for commercial use, e.g., advertisements, by members of the group but unidentified individuals who are not members of the group may not have authorized use of their images for such purposes.

A variety of techniques can be used to modify images of individuals in a group image. In some embodiments users can provide a replacement image to be used in place of their actual captured image. Alternatively, a replacement image can be generated from an image of a particular individual with which the replacement image is to be associated by modifying the image to make it difficult for the individual to be identified. This may involve altering eye position, change skin tone or hair color or making various other size or shape modifications. By allowing an individual to provide or have a replacement image stored for use in generating modified images, the individual can have his/her image replaced with another image which is consistent in appearance even though it may be used in multiple different group images. This results in different group images being consistent over time making it somewhat difficult to figure out that the image is, in fact, not an accurate representation of the image. Consider for example that different team images will seem to have the same players over time if the modification process is based on replacing the actual team members with images that are generated from stored replacement images corresponding to the team members. The modified team images, corresponding to different times, in such a case will appear to show the same team even though the actual team member's images were replaced in the different team images. By allowing the individual to provide the replacement image which is to be used to replace his/her likeness the individual has an opportunity to control how he will be perceived in the images while protecting his/her privacy at the same time. This can be particularly important where school or other group images maybe used in an attempt to identify children of rich families for kidnapping or other reasons that pose a security risk or danger to the individual child or group member.

Biometric information which can be used by the server to identify group members is provided by the individual group members in some embodiments. This information maybe and sometimes does include images or image data which can be used to recognize the individual group member.

While group images are provided to the server with information identifying the group to which the image corresponds, this is not necessary and not the case in all embodiments. In some embodiments images are processed to identify individuals and then the information on the identified individuals in a group is checked against group image definition rules to determine what group, if any, a received image corresponds to.

Once a group image is determined to correspond to a particular group, modification and distribution rules are applied to the group image. This often involves generating a modified group image for distribution to non-group members. It may also sometimes does involve generation of a modified group image for distribution to group members. By allowing groups and/or individuals input on the rules and/or modifications made to images of individuals in a group image, privacy rights can be protected while still allowing group images to be generated and distributed in an automated manner that is consistent with one or more privacy agreements that may have been entered into between the group, group members and/or the entity, e.g., school, which captures and distributes images using the server of the present invention.

Numerous additional features, benefits and embodiments are discussed in the detailed description which follows.

DETAILED DESCRIPTION

Figure 1:
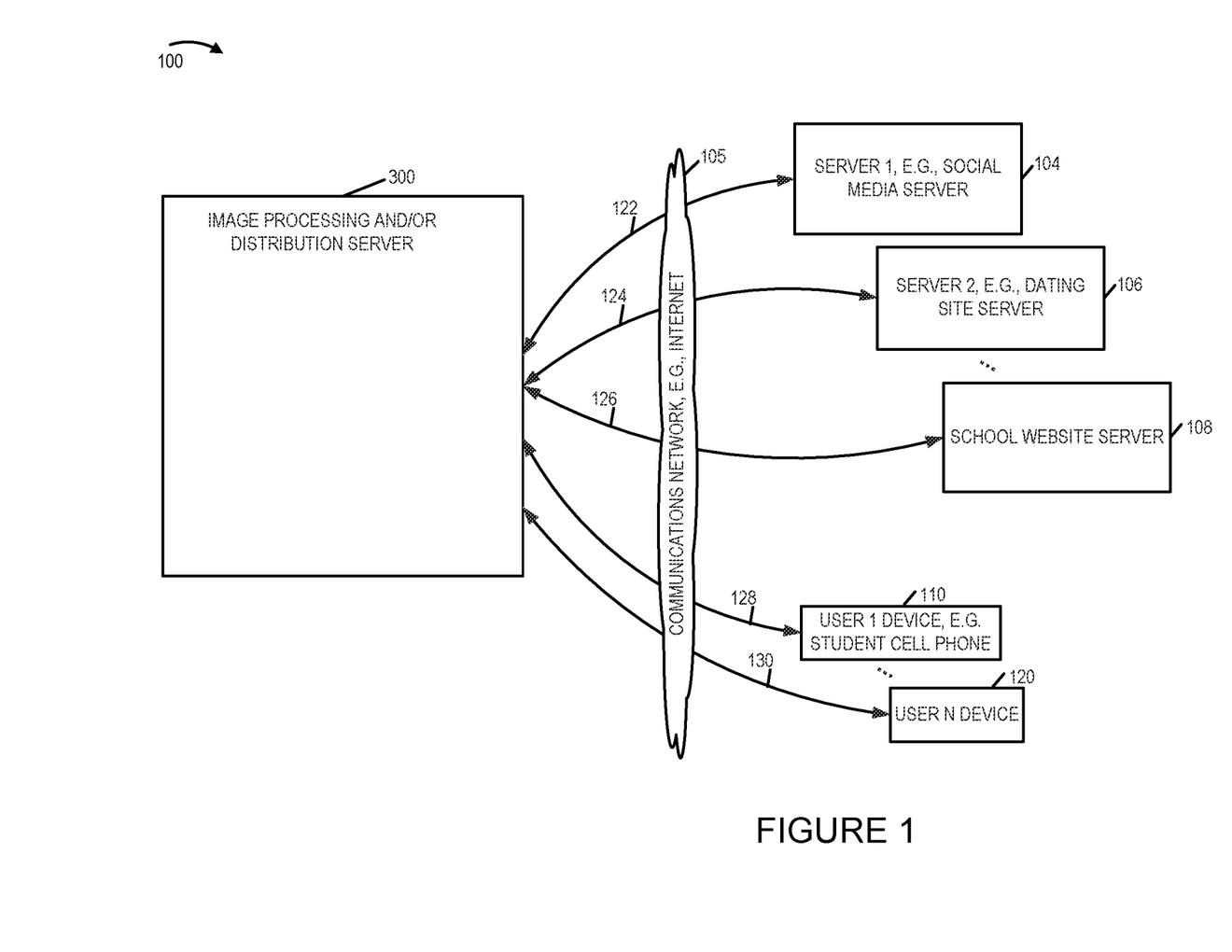
FIG. 1 illustrates an exemplary system implemented in accordance with the present invention.

FIG. 1 illustrates a system 100 implemented in accordance with the present invention. The system includes an image processing and/or distribution server 300 which is coupled by a communications network, e.g., Internet 105, to a first server, e.g., social media server 104, a second server, e.g., dating site server 106, a school website server 108, a user device, e.g., student cell phone 110 and additional user devices including user N device 120. Images can be and sometimes are captured by the user devices 110 and/or 120 and supplied to the image processing server 300 for processing prior to distribution to one or more entities, e.g., individual users, web sites or corporations. In addition individuals using the school server 108 or social media servers 104, 106 can submit images through the servers for processing by the image processing server 300 prior to posting or distribution to the general public or other group members. Users can also request form the server 300 previously processed images.

Operation of the server 300 will be explained with reference to FIG. 2 after a brief discussion of the components of the server 300 which will now be discussed with reference to FIG. 3. As shown in FIG. 3, in some embodiments the image processing and/or distribution server 300 includes a display device 302, an input device 304 (e.g., keyboard), an input/output (I/O) interface 306, a memory 312 a processor 308 and network interface 310 which are coupled together by bus 309 and which can communicate with one another over the bus 309. The network interface 310 can be a wired or wireless network interface which includes a transmitter circuit 340 for transmitting signals and a receiver circuit 342 for receiving signal. In some cases the network interface 310 coupled the server 300 to the network 105, e.g., Internet, allowing the server 300 to receive information and data from the devices shown in FIG. 1 and send information and images to the devices shown in FIG. 1. In some cases images received by the server 300 include group images to be processed and the images sent by the server 300 include received group images which are stored for distribution and/or modified versions of one or more group images which were generated, as will be discussed below, by the server 300 processing a received group image.

Figure 2:
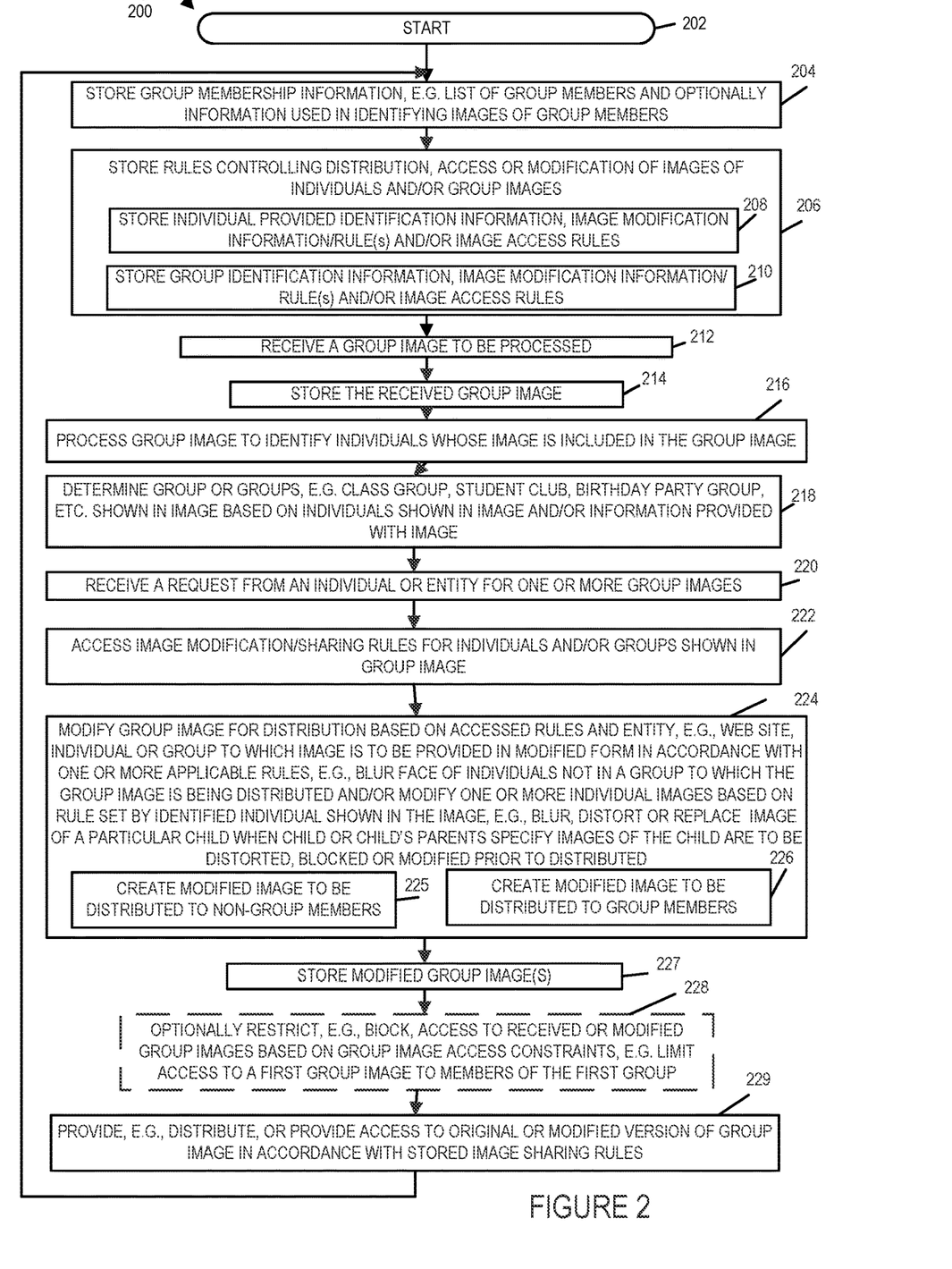
FIG. 2 is a flowchart illustrating the steps of an exemplary method of operating an exemplary privacy control server in accordance with an exemplary embodiment of the invention.
Figure 3:
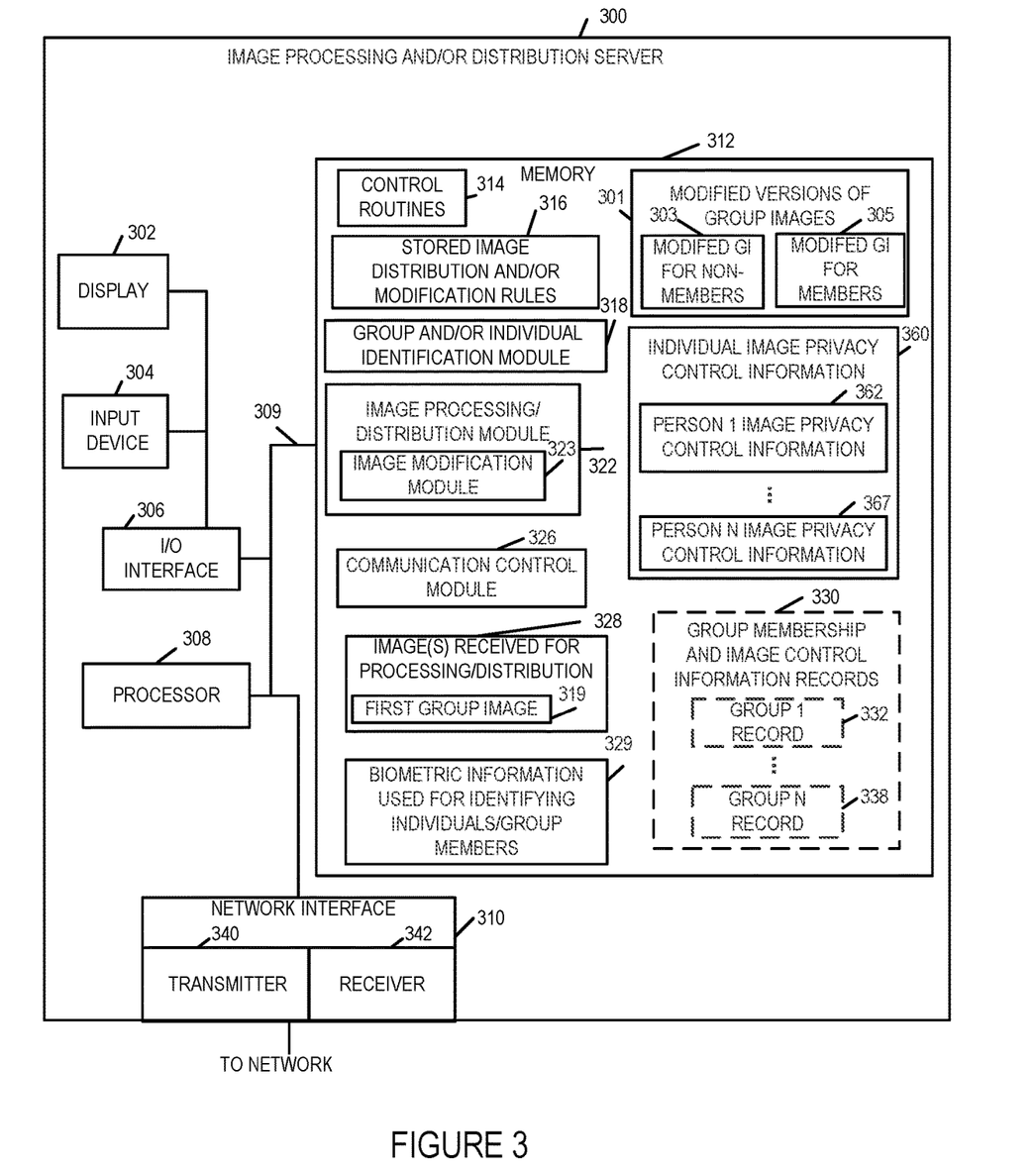
FIG. 3 shows an exemplary image processing and/or distribution server that can be used in the system of FIG. 1.

The processor 308, operating under control of one or more of the routines stored in memory 312, configure the processor 308 to control the image processing and/or distribution server to implement the steps of the exemplary method shown in FIG. 2. In some embodiments, the memory 312 includes one or more control routines 314 which control the processor to implement the method steps shown in FIG. 2. In addition to the control routines memory 312 includes stored image distribution and/or modification rules 316 which can be and sometimes are used in controlling group image processing and/or distribution in accordance with the present invention. The memory 312 also include a group and/or individual identification module used to identify individuals in a group image, e.g., based on biometric or example images that correspond to an individual person. The memory 312 also includes an image processing/distribution module 322 which includes an image modification module. The image processing and distribution module controls distribution of images to requesting entities and also controls the generation of one or more modified group images which can be and sometimes are distributed to a requesting entity as will be discussed further with regard to FIG. 2. The memory also includes a communication control module 326 for controlling communications with other devices, e.g., via network interface 310. The memory 312 also includes image which have been received for processing and/or distribution, e.g., group images, such as first group image 319. Information 329 which is stored in the memory 312 include biometric information used for identifying individuals and/or group members. The information 329 may include sample images of people to be identified and/or biometric values or parameters which can be used to identify images of individuals of interest which may be and sometimes are included in group images. As part of the processing modified versions of group images are generated. Such images are stored in modified image store 301 which includes at least a modified Group 1 image 303 which intended for distribution to non-Group 1 members and a modified Group 1 image 305 which is intended for distribution to Group 1 members. For space reasons the modified images of other groups are not shown but are included in memory portion 301. Individual image privacy control information 360 is also included in memory 312 and includes individual privacy related information for different persons such as person 1 through person N. Person 1's information is included in information set 362 while Person N's privacy information is included in set 367.

Group membership and group image control information 330 is also included in memory 312 and includes in the illustrated example an information record for each group, e.g., Group 1 record 332 through Group N record 338.

Figure 4:
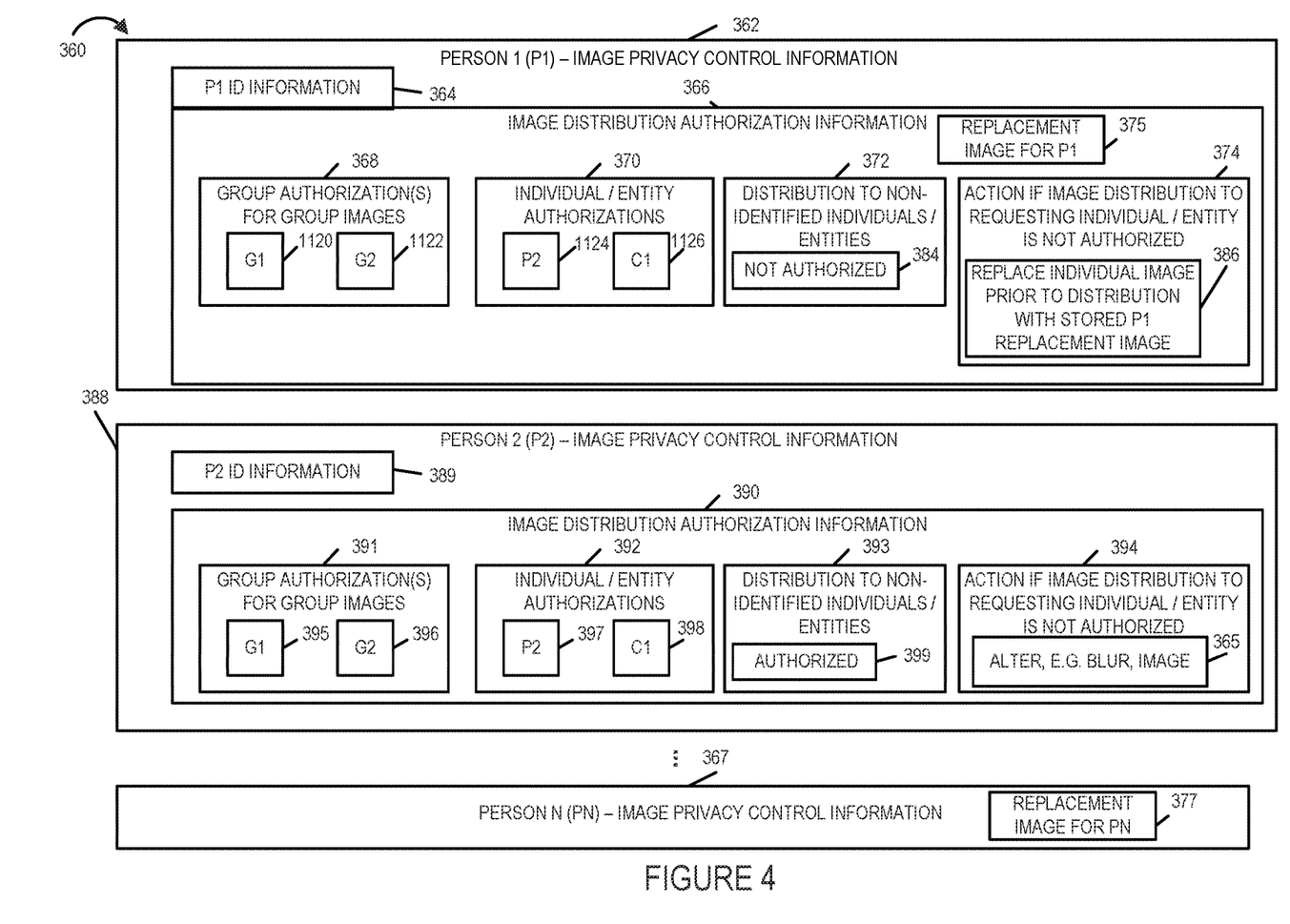
FIG. 4 shows exemplary image privacy control information for a plurality of individual people which is stored and used by a server, such as the exemplary server of FIG. 3, in some embodiments.

FIG. 4 shows an exemplary set of individual privacy and control record information 360 that can be used as the information 360 stored in the memory 312 of server 300. The set of records 360 includes a first privacy and control record 362 corresponding to a first person P1, a second privacy and control record 388 corresponding to a second person P2 and an Nth privacy and control record 367 corresponding to an Nth person PN.

The first privacy and control information record 362 corresponding to person P1 includes P1 identification information 364 which can be used to detect, e.g., identify, images of individual P1 in a group image. The information 364 maybe and sometimes is biometric information including in some cases sample images of person P1. The information 362 further includes image distribution and authorization information 366 which relates to the handling of images of P1. Information 368 is information for group authorizations and list groups which are authorized to receive/retrieve unmodified images of P1. The authorized groups include G1 1120 and G2 1122 and the members of the identified groups are allowed to receive/retrieve unmodified images of P1 but group modification rules may require the modification of such images prior to distribution to non-group members or even group members as will be discussed with regard to stored group control related information. Individual entity authorizations 370 list individuals and entities which are authorized to retrieve and/or distribute images of P1. Information element 372 indicates whether or not non-identified individuals, e.g., entities and individuals not identified in information elements 368, 370, are allowed to access unmodified images of P1. In the case of P1, P1 has not authorized distribution of unmodified images of P1 to entities which have not been identified by P1 as indicated by the setting in information element 384. Action information 374 indicates an action to be taken when distribution/retrieval of an image including an image of P1 is being requested by an entity not authorized by P1 to receive a non-modified image of P1. Action rule 374 indicates in information element 386 that P1's image is to be replaced prior to distribution using a stored P1 replacement image. The P1 replacement image 375 is stored as part of the information record 366 and available whenever an image of P1 needs to be replaces to generate a modified group image. Replacement image P1 is provided by P1 or is generated by modifying an image of P1 and then stored. Replacement image 375 does not accurately reflect the facial features of P1 which is intentional since it is intended to be used to protect the privacy of P1.

The second privacy and control information record 388 corresponding to person P2 includes P2 identification information 389 which can be used to detect, e.g., identify, images of individual P2 in a group image. The information 389 maybe and sometimes is biometric information including in some cases sample images of person P2. The information 366 further includes image distribution and authorization information 390 which relates to the handling of images of P2. Information 391 is information for group authorizations and list groups which are authorized to receive/retrieve unmodified images of P2. The authorized groups include G1 as indicated in information element 395 and G2 as indicated in information element 396 and the members of the identified groups are allowed to receive/retrieve unmodified images of P2 but group modification rules may require the modification of such images prior to distribution to non-group members or even group members as will be discussed with regard to stored group control related information. Individual entity authorizations 392 list individuals and entities which are authorized to retrieve and/or distribute images of P2. Information element 393 indicates whether or not non-identified individuals, e.g., entities and individuals not identified in information elements 391, 392, are allowed to access unmodified images of P2. In the case of P2, P2 has authorized distribution of unmodified images of P2 to entities which have not been identified by P2 as indicated by the AUTHORIZED setting in information element 399. Action information 394 indicates an action to be taken when distribution/retrieval of an image including an image of P2 is being requested by an entity not authorized by P2 to receive a non-modified image of P2. Action rule 394 indicates in information element 394 that P2's image is to be altered, e.g., blurred, prior to distribution to an unauthorized entity. Since blurring does not require use of a replacement image, no replacement image is stored for P2.

Person N record 367 includes information which is the same or similar to that included for Persons P1 and P2 in records 362, 367 but with Person PN being responsible for the settings. Person N information 367 includes a replacement image 377 for person PN in the illustrated example.

Figure 5:
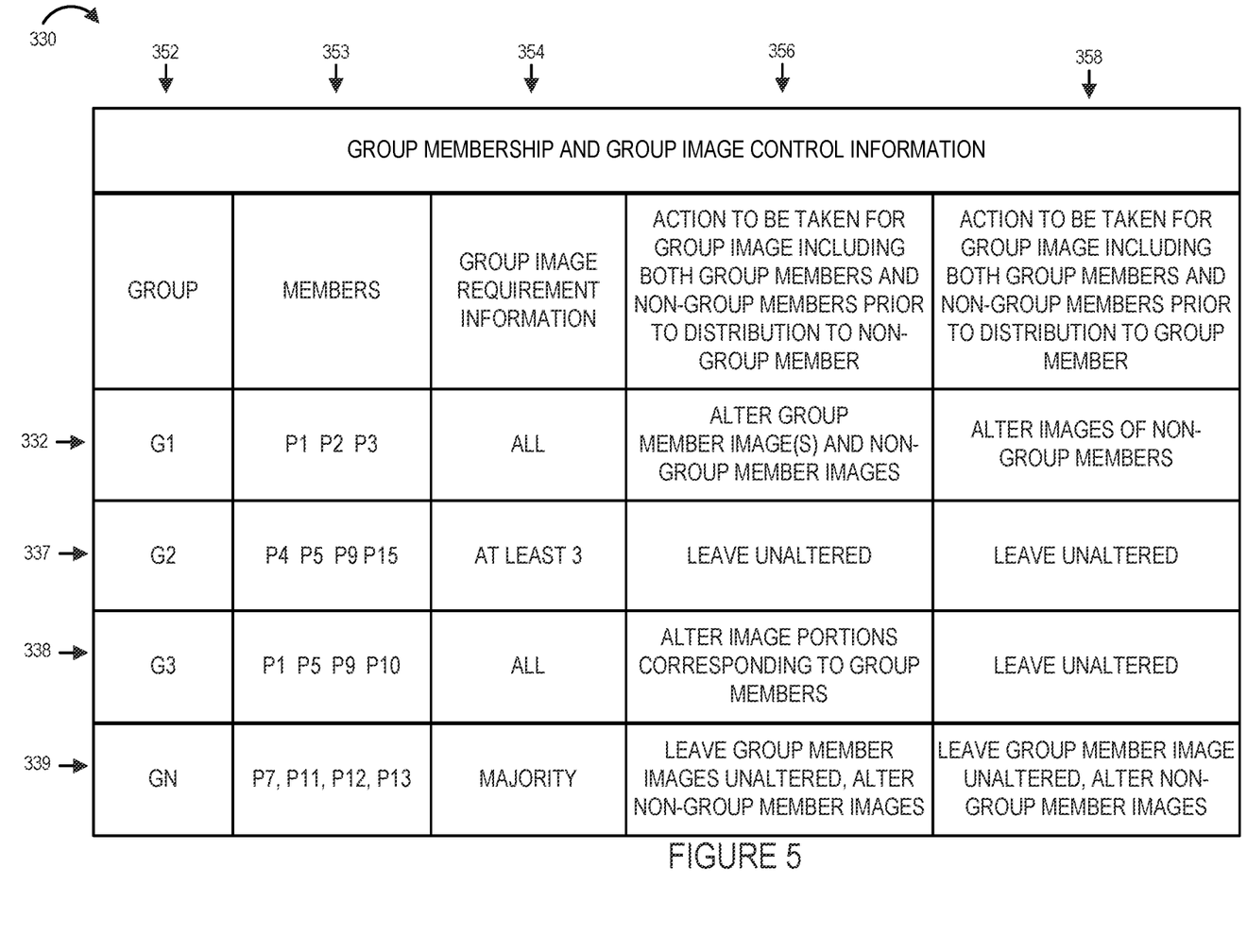
FIG. 5 shows exemplary group membership and group image control information, for a plurality of N different groups, which is stored and used by a server, such as the exemplary server of FIG. 3, in some embodiments.

FIG. 5 shows exemplary group membership and group image control information 330 that can be stored in the memory 312 of the server 300 and used to control when an image including multiple individual will be determined to correspond to a listed group and when group images are to be modified.

The first column 362 of the group membership and control information 330 identifies the group to which a row of information corresponds. The second column 353 lists the members of the group to which a row corresponds. The second column may and sometimes does include in addition to a name or text identifier of the group members biometric information to be used in identifying images of the individual listed group members in a group image. The third column 354 lists what the requirements are, in terms of images of members of the group being determined to be in an image, for an image to be considered a group image corresponding to the group of the row in which the information is included. The fourth column 356 lists the action to taken on a group prior to distribution to a non-group member, e.g., an entity which is not a member of the group to which the group image corresponds. Column 358 indicates an action to be taken for a group image prior to distribution to a group member.

Row 1 332 corresponds to Group 1 (G1), row 2 337 corresponds to Group 2 (G2), row 3 338 corresponds to Group 3 (G3) and row 4 339 corresponds to Group N 339. Rows corresponding to additional groups maybe and sometimes are included in table 330.

Consider for example the information in row 332 corresponding to Group 1. Column 362 indicates that the row correspond to group G1, member information in column 353 indicates that the group includes three individual people P1, P2 and P3. The third column 354 indicates that for a group image to be determined to be a Group 1 group image all the members of the group, i.e., P1, P2, P3, have to be in the group image. Column 256 indicates that images determined to correspond to Group 1 be modified by altering group member images and non-group member images prior to the modified Group 1 image being distributed, e.g., provided to, an entity which is not a Group 1 member. Column 358 indicates that images of non-group members included in a Group 1 image should be altered prior to a Group 1 image being provided to group members. This can be useful when individuals who are not members of the group may be incidentally captured in a Group 1 image. For example, at a birthday party non-invited individuals, e.g., children, who are not part of the party group represented by Group 1 may have there images blurred or altered while the images of the children who were invited and consented to having their image taken will have there images unaltered when a Group 1 image is distributed to members a Group 1 member.

The second row 337 corresponds to G2. For group G2 for an group image to be declared a Group 2 image at least 3 group members need to be identified as being in the image. Thus an image with any 3 of P4, P5, P9 and P15 will be a Group 2 image. In the case of Group 2 images alteration is not required by the group before distribution of the images.

Group 3 information is included in the fourth row 338. In this case Group 3 group images will altered to modify images corresponding to group members before distribution to non-group members. This can be useful for cases where the group want to keep their membership secret but may still want to use images to promote the Group, e.g., by showing group activities or buildings but keeping individuals of the group concealed or blurred. For distribution to members of the Group, G3 images are not altered as shown in column 358.

Group N includes similar information for Group N to that which was discussed with regard to the other Groups. Note however in group GN information 339, in column 354 it indicates that a majority of group members need to be identified in an image for the image to be considered a Group N image. This shows that the number of members of a group required to be detected in an image can be expressed as a fraction or portion of the total numbers in the group. This value can be set and left unchanged as the number of members of the group changes over time with the server 300 determining if an image satisfies the constraint based on the number of members listed in column 353 at a given time the determination is made. Thus information in column 353 can be updated while the information in column 354 can be left unchanged and expressed as a portion of the total number of group members. In the case of the GN information 3 would be a majority since there are 4 members shown in the group.

Having discussed the components of the server 300 and information used by the server 300 operation of the server in accordance with the invention will now be explained with reference to FIG. 2. FIG. 2 shows a method, implemented by a server 300, of processing and distributing group images in accordance with one exemplary embodiment.

The method 200 starts in step 202 with the server being powered on and executing the control 314 and other routines stored in memory 312. Operation proceeds from start step 202 to storage step 204 in which group membership information, e.g., a list of group members and optionally information used in identifying images of group members is stored.

Operation proceeds from step 204 to step 206 which involves the server 300 storing rules for controlling distribution, access or modification of images of individuals and/or group images. This may involve the storage of the information shown in FIG. 4 and/or information shown in FIG. 5. In some embodiments step 206 includes sub steps 208 and 210. In step 208 the server stores individual provided identification information, image modification information, rules and/or image access rules. In some embodiments step 208 involve the storage of some or all of the information shown in FIG. 4. In step 210 the server 300 stores group image identification information, image modification information rules and/or image access rules. This involves storing some or all of the information shown in FIG. 5. All or portions of the information shown in FIG. 5 maybe and sometimes are stored in steps 204 and 206 with the different steps relating to information shown in different columns of FIG. 5.

Operation proceeds from step 206 to step 212 in which the server receives a group image to be processed. The image maybe an image captured by a user device, supplied by a group member or an image from another source. The group image maybe received in step 212 with information indicating the group to which it corresponds or without such information.

In step 214 the received group image is stored. The in step 216 the group image is processed to identify individuals whose image is included in the group image. The identified individuals may or may not be members of a group. Identification information included in the personal records shown in FIG. 4 or the group records shown in FIG. 5 maybe and sometimes is used to identify one or more individuals included in the received group image.

With individuals in the group image having been identified operation proceeds to step 218 in which a determination is made as to which group or groups the image corresponds to. Group membership information, information on the individual determined to be shown in the group image, i.e., identified individuals, and the number of members of a group which need to be shown in the image for the image to be considered a Group image corresponding to a group for which information is stored is used in making the determination in step 218. Once it is determined what group or groups an image corresponds to operation proceeds to step 220. In step 220 a request from an entity, e.g., an individual or website, is received at the server for the group image which was processed.

In step 222, image modification and/or sharing rules for individuals and/or groups shown in the group image being requested is accessed to determine if the image is to be modified, e.g., before being returned to the requesting entity assuming the entity is entitled to receive the requested image. Required modification maybe and sometimes are dependent on the entity to which the requested image is to be supplied.

Operation proceeds from step 222 to step 224 in which the group image is modified for distribution based on the access rules and the entity to which the image is to be supplied. Modification maybe and sometimes does involve altering the images of one or more people in the group image. Depending on the rules used to determine what if any modification is to be made, images of identified group member and/or of images of non-group members maybe altered. Alteration can involve replacing of an identified individual's image, e.g., with a stored image corresponding to the identified individual, blurring of the individual's image and/or other image modifications to make the individual difficult or impossible to accurately identify. In some embodiments step 224 includes one or both of steps 225 and 226. In step 225, a modified image to be distributed to non-group members is generated. For example, if the requested image is a Group 1 images, non-group members would individuals who are not in Group 1. In step 226 a modified image to be distributed to group members is generated. The generation in steps 225, 226 can be in accordance with the rules/information included in the chart of FIG. 5.

With the modified images having been generated operation proceeds to step 227 in which the modified group image(s) generated in step 224 are stored in memory prior to distribution.

In step 228 a decision is made if access to a received or modified image is to be blocked, e.g., based on the fact that the entity requesting the particular image is not to be supplied with it. If the requesting entity is to be blocked from receiving the requested image or a modified version of the requested image access to the group image is blocked in step 228 and the requested Group image or modified group image is not supplied to the requesting entity. This may be implemented as a security measure to block request to group images from individuals or entities which are not a member of the group for which the Group image is requested.

In step 229, assuming the requesting entity is entitled to receive the requested group image or a modified version of the requested group image the requesting entity is provided access to the image which the requesting entity is authorized to receive based on the stored information, e.g., the information shown in FIGS. 4 and 5.

With a group image having been processed and supplied to a requesting party the processing of one or more images proceeds on an ongoing basis as represented by the arrow proceeding from step 229 to step 204.

Figure 6:
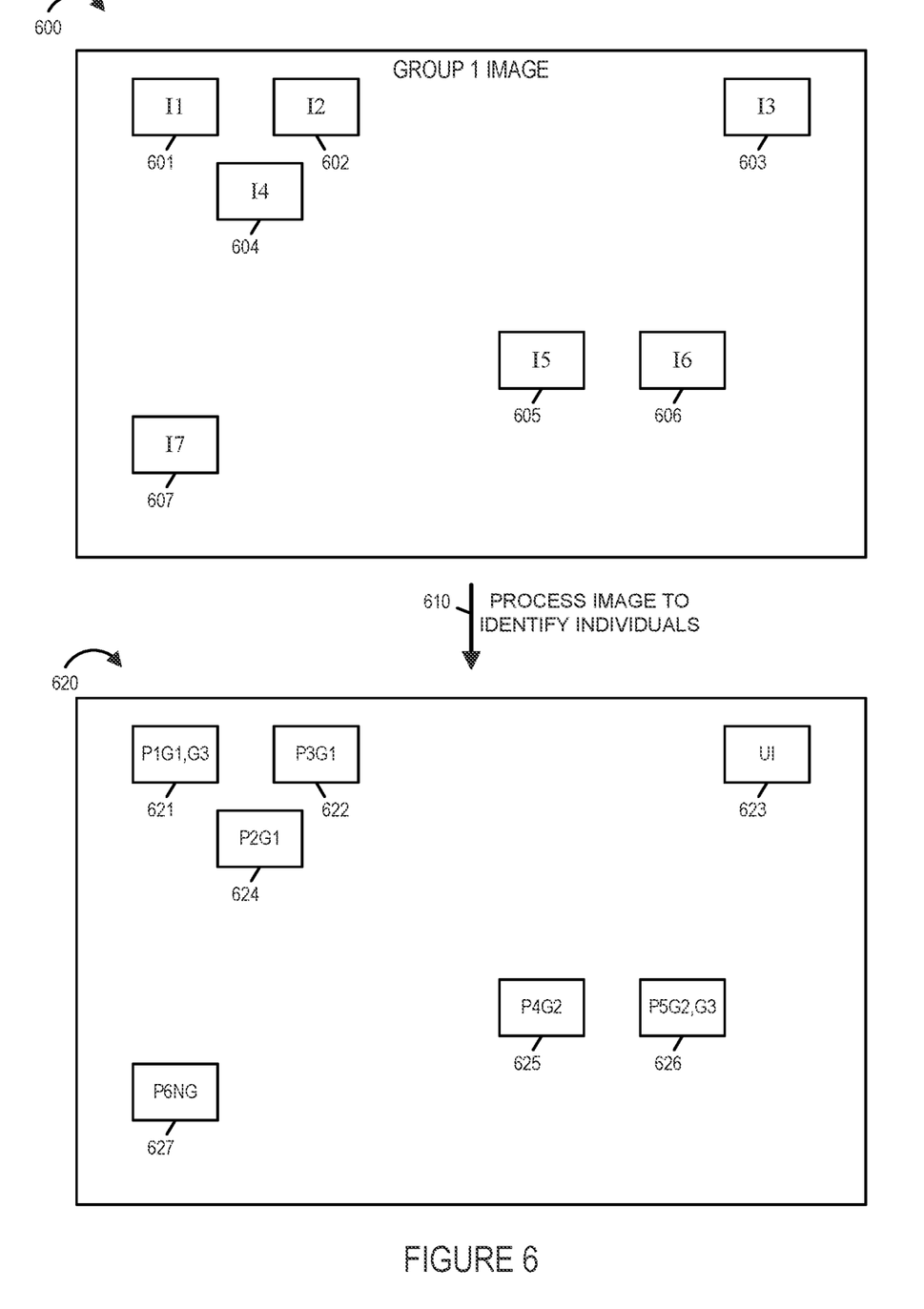
FIG. 6 shows an exemplary group image corresponding to a first group and the result of processing the group image to identify individuals whose images are included in the group image.

FIG. 6 is a diagram showing an exemplary group image 600 corresponding to a first group G1 and the result of processing the group image 600 to identify individuals whose images are included in the group image. In the FIG. 6 example the group image 600 includes images I1 601, I2 602, I3 603, I4 604, I5 605, I6 606 and I7 607 corresponding to seven different people. At the time the group image 600 is received which group or groups the group image corresponds to will often be unknown. Even if information is provided indicating that it corresponds to a particular group the server 300 will normally have to check if a sufficient number of individuals corresponding to the group are in the group image 600 to consider it a Group image corresponding to the group for image processing purposes.

Arrow 610 represents the processing of the group image 600 to identify individuals in the group image. Depending on the information available to the server 300 it may not be possible to identify all individuals in the group image 600.

Processed image 620 represents the results of the identification process 610. Each box in image 620 represents the identification information determined for the corresponding individual person image shown in group image 600. Box 621 corresponds to image I1 601 and corresponds to identified person P1 with the group membership information for P1 being shown in the box 621 along with the person identifier P1. Group membership is determined based on the information shown in FIG. 5. Person P1 is a member of Groups G1 and G3 Box 622 shows that image I2 602 corresponds to person P3 who is a member of group G1. Box 623 corresponds to I3 603 and shows that the person to whom image I3 corresponds is unknown with an identification not being made as indicated by the letters UI in box 623. Box 624 corresponds to I4 and shows that I4 was identified as corresponding to person P2 who is a member of group G1. Box 625 corresponds to image I5 and indicates that image I5 was identified as corresponding to person P4 who is a member of Group 2. Box 626 corresponds to image I6 606 and indicates that I6 was identified as person P5 who belongs to groups G2 and G3. Box 627 corresponds to image I7 and indicates that image I7 was identified as corresponding to person P6 who is not a member of any groups as represented by the letters NG after P6 in block 627.

Based on the Group image determination requirements shown in FIG. 5, the server 300 determines that the group image 1000 is a Group 1 image. This is because FIG. 1 includes all of the members of group 1, i.e., it was determined to include images of group members P1, P2, P3. The server also determines that the requirements for the image 600 to be considered as a group image of one of the other groups is satisfied based on the identified people and the requirements for group members for the image to be considered a group image of one of the other listed groups. For example, to be a Group 2 image the image 1000 would have to include at least three of P4, P5, P9, P15 who are group 2 members. While the image includes an image identified to correspond to P4, the presence of a single G2 member does not satisfy the requirements for image 1000 to be a Group 2 image. Similarly, the G3 and GN group image requirements shown in column 354 are not satisfied by the identified individuals included in FIG. 1000.

Figure 7:
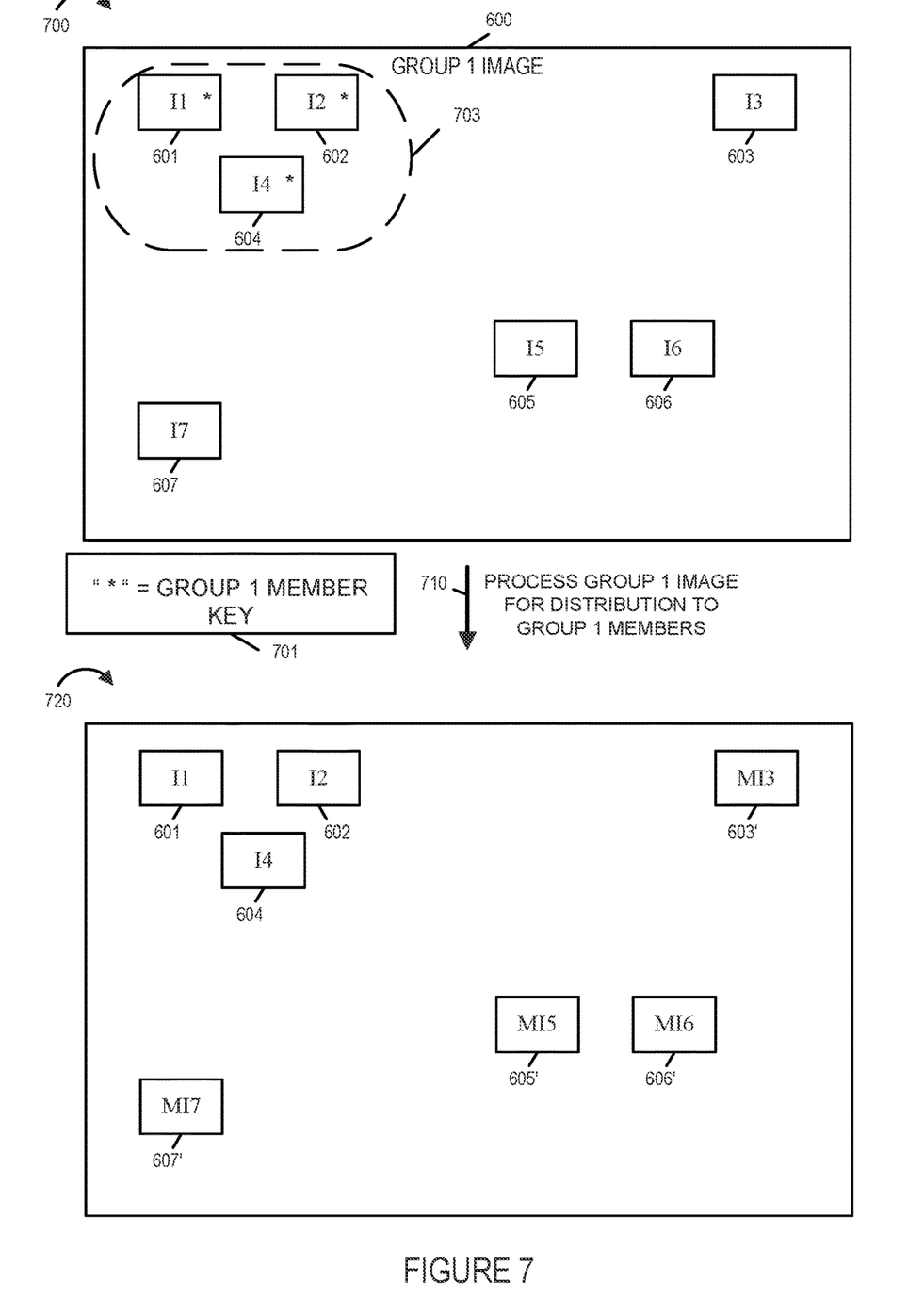
FIG. 7 shows the processing of the first group image of FIG. 6 to produce a modified group image for distribution to members of the first group to which the group image being processed corresponds.

FIG. 7 shows the processing of group image 600 to create a modified image for distribution to group members, i.e., members of Group 1 since Group 1 is determined to be a Group 1 image based on the identified individuals included in the image. In block 700 oval 703 is added in FIG. 7 to show the members of Group G1 with a * being added next to the image identifiers I1, I2, I4 to show the members of the group and help with understanding of the processing as shown in Key 701. The oval 703 and * are not added to the actual image 600 as part of the modification process.

In FIG. 7 arrow 710 represents processing of the Group 1 image 600 by the server 300 to generate an image to be distributed to Group 1 members. Box 720 represents the modified image generated by processing the image 600 in step 710. In image 720 note that images I1 601, I2 602 and I4 604 are unaltered since Group 1 members are not to have there images modified for distribution to Group 1 members (see col 358 row 332 of FIG. 5) but images of non-group members are to be altered, e.g., modified, to generate a modified Group 1 image for distribution to Group 1 members. M is used to show modified versions of the corresponding images of people. In FIG. 7 images I3 603', I5 605', I6 606' and I7 607' are modified to generate modified image 720. M is used before the image identifier in the figures to show that the image portion has been modified. Thus images of individuals represented by blocks 603', 604", 606' and 607' are modified images while images 601, 602, and 604 are unmodified.

Figure 8:
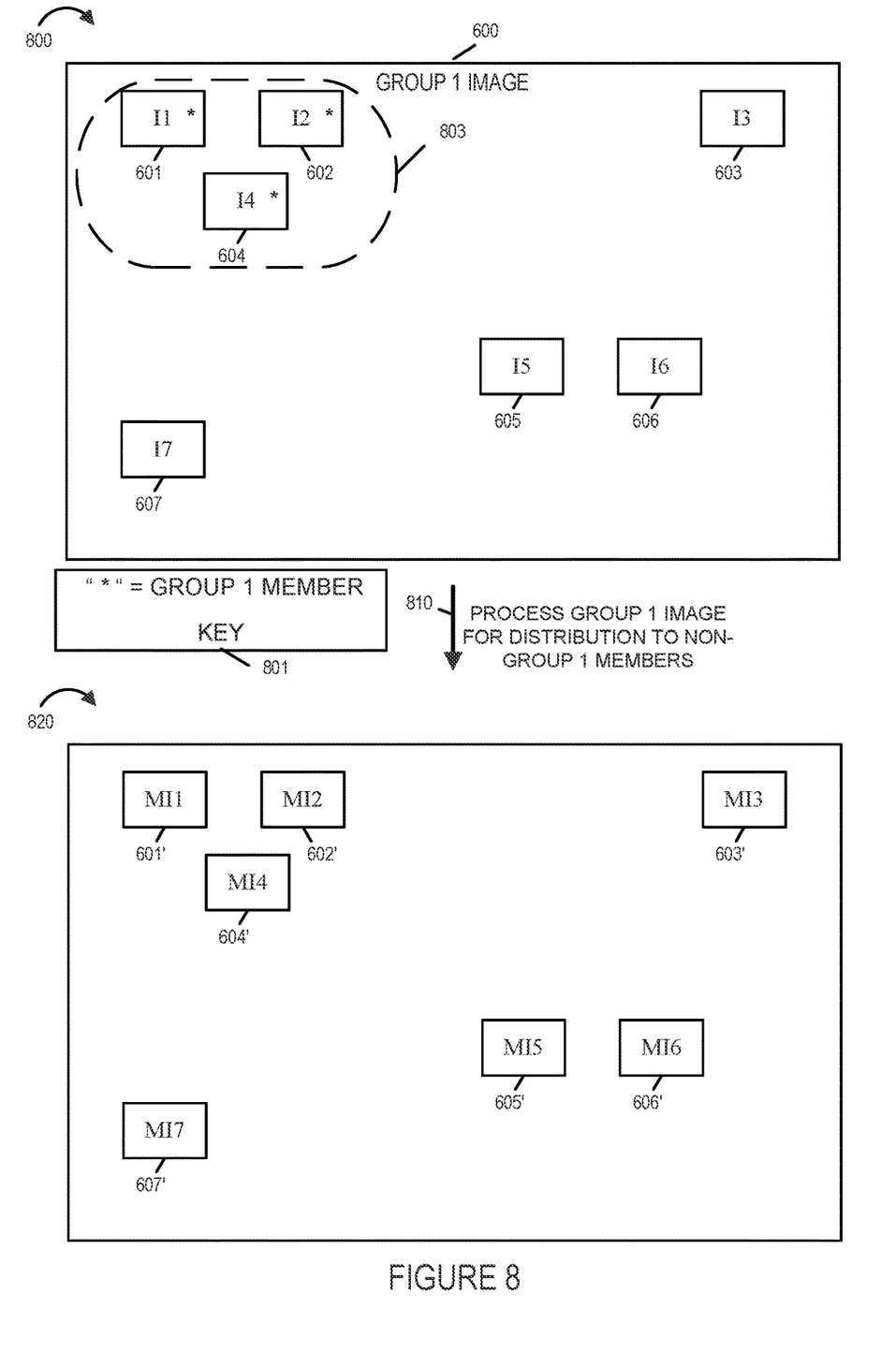
FIG. 8 shows the processing of the first group image of FIG. 6 to produce a modified group image for distribution to entities, e.g., individuals, corporations or devices, which are not members of the first group to which the group image being processed corresponds.

FIG. 7 shows the processing of the first group image of FIG. 6 to produce a modified group image for distribution to members of the first group to which the group image being processed corresponds while FIG. 8 shows the processing of the first group image 600 of FIG. 6 to produce a modified group image 820 for distribution to entities, e.g., individuals, corporations or devices, which are not members of Group 1 to which the group image being processed corresponds.

In FIG. 8 block 800 shows the first image 600 with the Group 1 members identified by using a * s shown in key 801 and with the Group 1 members being surrounded by oval 803.

Based on the rules in column 356 and row 332 of FIG. 5 images corresponding to Group 1 are to have both group members and non-group member images altered for distribution to non-group members in processing step 810 represented by the arrow. Accordingly, in the FIG. 8 example all the image portions corresponding to individuals are modified to generate image 820. That is image portion 601' corresponding to I1, image portion 602' corresponding to I2, image portion 603' corresponding to image portion I3, image portion If 605' corresponding to image portion I5, image portion 606' corresponding to image portion I6 606 and image portion 607' corresponding to image portion I7 are all altered, i.e., modified, image portions in the FIG. 8 example thus protecting the privacy of all the individuals shown in the modified group image 820.

It should be appreciated that images corresponding to other groups, e.g., Group 2 images, Group 3 images and Group 4 images will be processed in accordance with the rules in columns 356 and 358 applicable to the particular group whose image is being processed.

Numerous variations on the above described methods and apparatus are possible.

In at least some embodiments, group membership information is stored and image sharing constraints are applied, taking into consideration the group or groups to which an individual shown in an image belongs and the entity to which the image is to be distributed. In various embodiments, image sharing information can be set by an individual or other entity and stored in the server. The image processing and distribution server processes the group image and generates various different versions of the image based on sharing constraints that are specified by one or more individuals included in the image being processed or by the entity submitting the image for processing.

Group images may be, and often are, taken at amusement parks, classroom/team settings, etc. While an image might include a large number of people, e.g., 8 people in a cart of an amusement park ride, the image may and sometimes is interpreted as including images of multiple smaller groups or subgroups, e.g., a particular person might take a helicopter ride or go on a rollercoaster with I2 people but only 4 are in the party associated with the particular person with the rest being strangers to the particular person who the particular person doesn't want to see in images from the park and/or may not want to share his/her image with the strangers.

A similar situation might arise where parties, e.g., birthday parties, overlap at a catering hall or restaurant. This often happens when a child's birthday party is hosted at a play site or entertainment facility.

Users are provided with a way to associate themselves with other users, e.g., they can provide information on the members of their group to the image processing and distribution server and can specify the nature of the relationship. This can be done by uploading the relationship information to the server responsible for processing and distributing images. Relationship information can and sometimes does include familial, organizational/business, transactional, or other relationships. This information is used to describe and control image modification and access rights, e.g., specify the ability or right to share the visual content, including automatic discovery of sharing partners, e.g., other entities such as websites used to store or distribute images, as appropriate.

For example, the distribution limitations of a particular set of data may extend to "friends-of-friends" or "friends-of-family." This will be represented in a graph-like structure that will be generally available (e.g. globally) and will also be presented during the distribution process for a given source image/video. Utilizing this graph, users will be able to establish sharing conditions that determine when and where their images will be automatically censored and/or restricted (or alternatively allowed).

When images/videos are disseminated, facial recognition technology is utilized on the server to automatically identify users that have agreed to distribution and the limits thereof. For example, when a photograph is posted to the system, a user that downloads or views that image may only be able to see part of the image that contains their allowed peer-groups (discerned through analysis of the sharing-rights graph). The rest of the users' content that is not approved for distribution to the requesting user may be hidden, cropped, or blurred as appropriate.

Similar restrictions and/or image modifications are applied when a party posts a group image to social media using the image processing and distribution server. The server may and sometimes does restrict a user to posting and/or seeing faces of a group image which are known friends of the person using the server or who have authorized posting of images.

In some cases, the server provides images to users on request and operates as an image distribution device. In such cases the entity, e.g., person seeking to access a group image is taken into consideration and what portion or portions of the image the user is able to access and view without alteration depends on which group the user belongs to and/or the settings of the people shown in the group image.

For example, a child who attended a birthday party may be able to see the images of other children in the same party, while the faces of children attending another birthday party at the same site are blurred in the group image being viewed or accessed.

In some embodiments, when group images stored one the server are accessed, group members are restricted to seeing faces of individuals are in the same group, e.g., a defined group of friends, party participants, or a class with all other individual's faces being blurred or otherwise altered.

While various embodiments have been discussed above, it should be appreciated that not necessarily all embodiments include the same features and some of the features described above are not necessary but can be desirable in some embodiments. Numerous additional features, embodiments, and benefits of various embodiments are possible.

The techniques of various embodiments may be implemented using software, hardware, and/or a combination of software and hardware. Various embodiments are directed to apparatus, e.g., control nodes/security servers. Various embodiments are also directed to methods, e.g., method of controlling and/or operating a communications device, e.g., a privacy control node and/or communications systems. Various embodiments are also directed to non-transitory machine, e.g., computer, readable medium, e.g., ROM, CDs, hard disks, etc., which include machine readable instructions for controlling a machine to implement one or more steps of a method.

In the above described methods, in some embodiments, each step may be performed by one or more different software instructions executed by a computer processor, e.g., a central processing unit (CPU), graphics processing unit (GPU), or tensor processing unit (TPU). Various apparatus and/or systems implemented in accordance with the present invention include means for implementing each of the various steps which are part of the methods of the present invention. Each means may be, e.g., an instruction, processor, hardware circuit and/or combination of elements used to implement a described step.

In various embodiments, nodes described herein are implemented using one or more modules to perform the steps corresponding to one or more methods, for example, query processing, receiving and/or transmitting steps. Various features of the present invention are implemented using modules. Such modules may, and in some embodiments are, implemented as software modules. In other embodiments the modules are implemented in hardware. In still other embodiments the modules are implemented using a combination of software and hardware. In some embodiments the modules are implemented as individual circuits with each module being implemented as a circuit for performing the function to which the module corresponds. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention.

Many of the above described methods or method steps can be implemented using machine, e.g., computer, executable instructions, such as software, included in a non-transitory machine, e.g., computer, readable medium used to control a machine, e.g., general purpose computer with or without additional hardware, to implement all or portions of the above described methods, e.g., in one or more nodes. The machine readable medium may be, e.g., a memory device, optical storage, floppy disk, etc. Accordingly, among other things, the present invention is directed to a machine-readable medium including machine executable instructions for causing a machine, e.g., processor and associated hardware, to perform one or more of the steps of the above-described method(s).

In some embodiments, the processor or processors, e.g., CPUs, of one or more devices, e.g., devices such as user equipment device (UEs), and/or control nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., privacy control node and/or a user device, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Exemplary Numbered Embodiments

Method Embodiment 1. A method of controlling access to or distribution of a group image including images of multiple individual people, the method comprising:
  operating a server to store (204) group member information (e.g., 330 as shown in FIG. 5) for a plurality of different groups ((e.g., G1 to GN);
  identifying one or more individuals whose image is included in the group image;
  modifying (224), at said server, the group image for distribution based modification rules associated with a first group to which said group image corresponds to produce at least a one modified version of the group image; and
  providing (228) the first modified version of the first group image to an entity (e.g., member of a group, corporation or individual) requesting the first group image.

Method Embodiment 2. The method of Embodiment 1, further comprising:
  determining a group to which the group image corresponds based on one or more identified individuals whose image is determined to be included in said group image.

Method Embodiment 3. The method of Embodiment 2, wherein determining the group to which the group image corresponds based on one or more identified individuals whose image is determined to be included in said group image includes:
  determining that the group image includes a number of individuals in the first group which are required by stored group information to be included in the group image for the group image to be a first group image.

Method Embodiment 4. The method of Embodiment 3, wherein said number of individuals is a fixed predetermined number (e.g., 2 or 3) of individuals specified in stored information.

Method Embodiment 5. The method of Embodiment 4 wherein said number of individuals is a function of the number of individuals in said group first group, said number being the minimum number of individuals which corresponds to a majority of the individuals in said first group.

Method Embodiment 6. The Embodiment of Embodiment 2, wherein modifying (224) the group image for distribution based modification rules associated with the first group to which said group image corresponds to produce at least one modified version of the group image includes: modifying (225) the group image to generate a modified first group image for distribution to entities (e.g., individuals, companies, etc.) who are not members of the first group.

Method Embodiment 7. The method of Embodiment 6, wherein modifying (225) the group image to generate a modified first group image for distribution to entities (e.g., individuals, companies, etc.) who are not members of the first group includes:
  altering images determined to correspond to members of the first group that are included in the group image.

Method Embodiment 8. The method of Embodiment 7, wherein altering images determined to correspond to members of the first group that are included in the group image includes blurring, changing or replacing an image corresponding to at least one member of the first group which is included in the group image.

Method Embodiment 9. The method of Embodiment 8, wherein altering images determined to correspond to members of the first group that are included in the group image includes replacing an image corresponding to at least one member of the first group which is included in the group image with: i) a stored image supplied by the member of the first group whose image is being replaced or ii) a stored image which was generated from another image of the first group member whose image is being replaced and which was stored for use in image replacement operations.

Method Embodiment 10. The method of Embodiment 6, wherein modifying (224) the group image for distribution based modification rules associated with the first group to which said group image corresponds to produce at least one modified version of the group image further includes:
  modifying (226) the group image to generate a modified first group image for distribution to members of the first group.

Method Embodiment 11. The method of Embodiment 10, wherein modifying (226) the group image to generate a modified first group image for distribution to members of the first group
  altering (227) an image of at least one individual in the first group image which is not a member of the first group.

Method Embodiment 12. The method of Embodiment 11, wherein altering (227) an image of at least one individual in the first group image which is not a member of the first group includes blurring, replacing or blurring an image of the at least one individual who is not a member of the first group.

Method Embodiment 13. The method of Embodiment 12, wherein altering (227) an image of at least one individual in the first group image which is not a member of the first group includes replacing the image of the individual who is not a member of the first group with: i) a stored image supplied by the non-member of the first group whose image is being replaced, ii) a stored image which was generated from another image of the non-member of the first group member whose image is being replaced and which was stored for use in image replacement operations or iii) by a stock image of an individual (e.g., of the same sex and approximately same age).

Method Embodiment 14. The method of Embodiment 6, further comprising:
  operating the server to restrict access (228) to the group image based on a group image access constraint which limits access to unmodified group images to members of the group to which an individual group image corresponds.

Method Embodiment 15. The method of Embodiment 6, wherein said first group are participants in a first birthday party and wherein said at least one person who is not a member of said first group is a participant or guest of a second birthday party.

Method Embodiment 16. The method of Embodiment 6, wherein said first group is a first class group, a first student organization group or a first school team group and wherein said at least one person who is not a member of the first group is a child or student who is not a member of said first group.

Server Embodiment 17. A server (300) comprising:
  a network interface 310 including a transmitter circuit 340 and a receiver circuit 342;
  a memory 312 storing a group image (319) including images of multiple people and also storing group member information (e.g., 330 as shown in FIG. 5) for a plurality of different groups ((e.g., G1 to GN);
  a processor (308) configured to control the server (300) to:
  identify one or more individuals whose image is included in the group image;
  modify (224), at said server, the group image for distribution based modification rules associated with a first group to which said group image corresponds to produce at least a one modified version of the group image; and
  provide (228) the first modified version of the first group image to an entity (e.g., member of a group, corporation or individual) requesting the first group image.

Numerous additional embodiments, within the scope of the present invention, will be apparent to those of ordinary skill in the art in view of the above description and the claims which follow. Such variations are to be considered within the scope. In various embodiments the user device are mobile nodes which are implemented as notebook computers, personal data assistants (PDAs), or other portable devices including receiver/transmitter circuits and logic and/or routines, for implementing the methods.

What is claimed is:

1. A method of operating a server, the method comprising:
  storing, in a storage device, group member information for a plurality of different groups;
  processing a first group image to identify one or more individuals whose image is included in the first group image;
  modifying, at said server, the first group image for distribution based on a modification rule associated with a first group to which said first group image corresponds to produce a first modified first group image from the first group image, said first modified first group image being different from said first group image; and
  providing the first modified first group image to an entity requesting the first group image.

2. The method of claim 1, further comprising:
  determining a group, to which the first group image corresponds, based on one or more identified individuals, whose image is determined by said processing to be included in said first group image.

3. The method of claim 2, further comprising:
 storing information corresponding to the first group, said information indicating a number of individuals in the first group that are required to be in a group image for the group image to correspond to the first group; and
 wherein determining the group, to which the group image corresponds, based on one or more identified individuals whose image is determined by said processing to be included in said group image includes:
 determining that the first group image includes the number of individuals in the first group that are required by stored group information to be included in the group image for the group image to correspond to the first group.

4. The method of claim 3, wherein said number of individuals is a fixed predetermined number of individuals specified in stored information.

5. The method of claim 4, wherein said number of individuals is a function of the number of individuals in said first group, said number being the minimum number of individuals which corresponds to a majority of the individuals in said first group.

6. The method of claim 1, wherein processing the first group image to identify one or more individuals whose image is included in the group image includes:
 using facial recognition technology to automatically identify said one or more individuals.

7. The method of claim 1 wherein the first group image is a photograph.

8. The method of claim 2,
 wherein modifying the first group image for distribution based on a modification rule associated with the first group to which said first group image corresponds to produce the first modified first group image includes:
 modifying the first group image, in accordance with stored information indicating how a first group image should be modified for distribution to an entity, which is not a member of the first group.

9. The method of claim 8, wherein modifying the first group image, in accordance with stored information indicating how a first group image should be modified for distribution to an entity, which is not a member of the first group includes:
 altering images determined to correspond to members of the first group that are included in the first group image.

10. The method of claim 9, wherein altering images determined to correspond to members of the first group that are included in the first group image includes blurring, changing or replacing an image corresponding to at least one member of the first group which is included in the first group image.

11. The method of claim 10, wherein altering images determined to correspond to members of the first group that are included in the first group image includes replacing an image corresponding to at least one member of the first group which is included in the first group image with: i) a stored image supplied by the member of the first group whose image is being replaced or ii) a stored image which was generated from another image of the first group member whose image is being replaced and which was stored for use in image replacement operations.

12. The method of claim 8, further comprising:
 operating the server to restrict access to the first group image based on a group image access constraint which limits access to unmodified group images to members of the group to which an individual group image corresponds.

13. The method of claim 8, wherein said first group is a group of participants in a first birthday party and wherein said at least one person who is not a member of said first group is a participant or guest of a second birthday party.

14. The method of claim 8, wherein said first group is a first class group, a first student organization group or a first school team group and wherein said at least one person who is not a member of the first group is a child or student who is not a member of said first group.

15. The method of claim 8, further comprising:
 storing, in said storage device, information corresponding to the first group, said information corresponding to the first group including information indicating:
 i) members of the first group; and
 ii) information indicating how a group image corresponding to the first group should be modified before distribution to an entity which is not a member of the first group.

16. The method of claim 15, wherein the information stored in the storage device corresponding to the first group further includes:
 information indicating how a group image corresponding to the first group should be modified before distribution to a group member.

17. The method of claim 16, wherein the information indicating how a group image corresponding to the first group should be modified before distribution to an entity which is not a member of the first group indicates that images of group members and images of non-group members in the group image should be altered.

18. The method of claim 17,
 wherein the information indicating how a group image corresponding to the first group should be modified before distribution to an entity which is a member of the first indicates that images of non-group members in the group image corresponding to the first group should be altered.

19. The method of claim 18,
 further comprising:
 receiving a request for the first group image from an entity; and
 wherein modifying the first group image for distribution based on a modification rule associated with a first group to which said first group image corresponds includes:
 altering images of both group members and images of non-group members in the first group image when the entity requesting the first group image is not a member of the first group; and
 altering images of non-group members in the first group image when the entity requesting the first group image a member of the first group but leaving images of group members in the first group image unaltered.

20. The method of claim 15, wherein the stored information corresponding to the first group further includes information indicating how many members of the first group need to be in an image for an image to correspond to the first group.

21. The method of claim 20, wherein the information indicating how many members of the first group need to be in an image for the image to correspond to the first group indicates all the members of the first group need to be in an image for the image to correspond to the first group.

22. The method of claim 20, wherein the information indicating how many members of the first group need to be in an image for the image to correspond to the first group indicates that at least 3 members of the first group need to be in an image for the image to correspond to the first group.

23. The method of claim 20, wherein the information indicating how many members of the first group need to be in an image for the image to correspond to the first group indicates that a majority of the members of the first group need to be in an image for the image to correspond to the first group.

24. The method of claim 3, wherein information indicating a number of individuals in the first group that are required to be in a group image for the group image to correspond to the first group indicates the number of individuals the first group required to be detected in an image as a fraction of the total numbers in the group.

25. A server comprising:
a network interface including a transmitter circuit and a receiver circuit;
a memory storing a first group image including images of multiple people and also storing group member information for a plurality of different groups;
a processor configured to control the server to:
process a first group image to identify one or more individuals whose image is included in the first group image;
modify the first group image for distribution based on a modification rule associated with a first group to which said first group image corresponds to produce a first modified first group image from the first group image, said first modified first group image being different from said first group image; and
provide the first-modified first group image to an entity requesting the first group image.

26. The server of claim 25, wherein the processor is further configured to control the sever to:
determine a group to which the first group image corresponds based on one or more identified individuals whose image is determined to be included in said group image.

27. The server of claim 26, wherein the processor is further configured, as part of being configured control the server to determine the group to which the group image corresponds based on one or more identified individuals whose image is determined to be included in said group image, to control the server to:
determine that the first group image includes a number of individuals in the first group which are required by stored group information to be included in the group image for the group image to be an image corresponding to the first group.

28. The server of claim 27, wherein said number of individuals is a function of the number of individuals in said first group, said number being a minimum number of individuals for the image to correspond to the first group, said minimum number being a majority of the individuals in said first group.

* * * * *